Nov. 18, 1952  J. F. DRAKE  2,618,548
CLOSED TOP SIDE DOOR
Filed Dec. 5, 1949

INVENTOR
JOHN F. DRAKE
BY
ATTORNEY

Patented Nov. 18, 1952

2,618,548

UNITED STATES PATENT OFFICE 2,618,548

CLOSED TOP SIDE DOOR

John F. Drake, Arcadia, Calif., assignor of one-half to Theodore G. Kennard, Glendora, Calif.

Application December 5, 1949, Serial No. 131,178

9 Claims. (Cl. 75—43)

This invention relates to cupola furnaces and in particular to a closed top side door charging cupola arranged for use in combination with dust-collecting equipment.

Cupola furnaces are commonly constructed with a discharge stack for waste gas and dust directly above the tall cylindrical cupola structure, and charging of the scrap iron and coke is effected through a side opening near the top of the cupola and below the stack, which opening at times may be closed or partly closed, in any event purposely admitting air for the combustion of the carbon monoxide and other combustible gases which are evolved from the burning charge in the cupola. The burning gases around and above the door generate much useless heat at this point and greatly increases the volume of gas discharged through the stack. The high temperatures caused by this burning of gas around the charging door shortens the life of the metal equipment. Even if tightly closed doors are provided for the intervals between charging operations, the gases which are discharged through the stack will then contain poisonous carbon monoxide whose discharge into the air is highly undesirable and is generally forbidden by law. The increasingly stricter requirements of communities for the control and elimination of dust and fumes requires that the discharged gases be treated before liberation into the atmosphere to remove the particulate matter, fumes and smoke. If the entire amount of the gaseous discharge from the stack is to be subsequently treated for removal of particulate matter, it is desirable that the volume of gas to be so treated be held to a minimum and it is also desirable that the temperature of the gas collected for treatment to remove particulate matter should be as low as possible so that steel conducting pipes may be used to convey the dust-laden gases to the treating equipment.

Because of the generation of carbon monoxide in the normal operation of a cupola furnace, it is undesirable merely to confine the gaseous discharge or close the top of the cupola for collection of the gases, with subsequent treatment for removal of solid contaminants. Furthermore, when the cupola top has been closed off from the stack, the volume of gases to be treated is reduced to a minimum, but there remains the danger of forming explosive mixtures of carbon monoxide and air in the gas-treating equipment outside the cupola. Because of the present existence of elaborate cupola charging equipment which is designed for use with a side charging door rather than with a closed bell type charger which, except for the great expense, might be added to existing cupolas, the modification of already built and operating cupolas to effect the collection and treatment of the gaseous discharge has been costly and unsatisfactory.

One object of this invention is to provide means for closing off a side charging cupola furnace which permits the collection and treatment of the gaseous discharge from the cupola without change in the cupola charging equipment. Another object is to provide a closed top side charging cupola with a side take-off pipe for the conveyance of the furnace gases to dust-removing equipment. Another object is to provide means for reducing the amount of carbon monoxide discharged at the top of the cupola furnace charge. A further object is to provide a closed top side-charging cupola furnace in which the carbon monoxide is below the combustible or explosive concentration. Another object is to provide a method of operating a cupola furnace to prevent the discharge of combustible concentrations of carbon monoxide gas at the top of the cupola charge. A still further object is to provide means for collecting the dirty gases evolved from a cupola furnace and for removing the objectionable air pollutants before discharge of the gas into the atmosphere.

These and other objects are attained by my invention which will be understood from the following description and the accompanying drawings in which.

Figures 1, 2, 3:
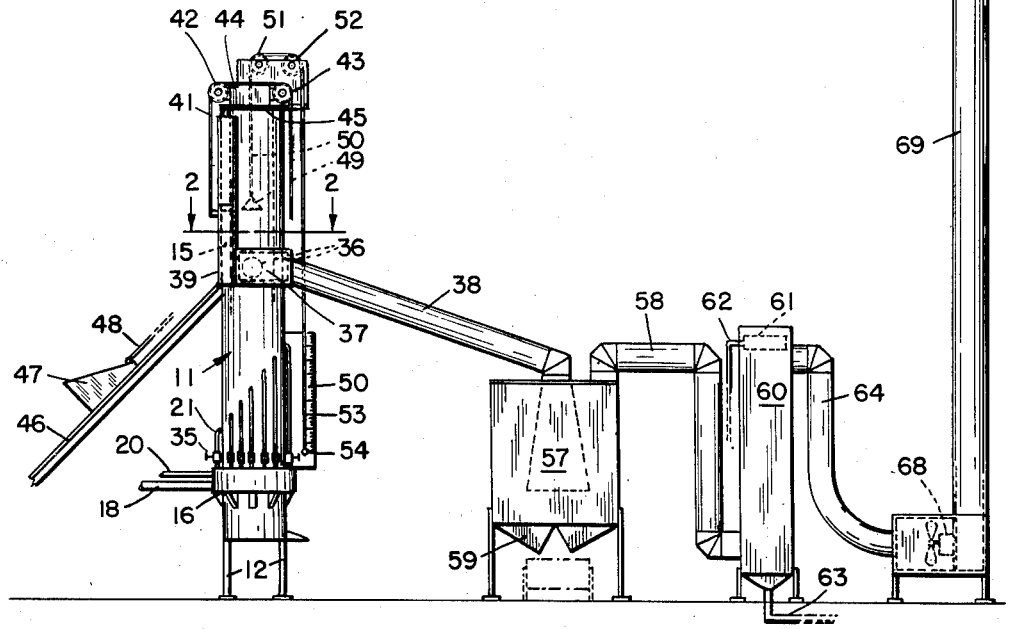
Figure 1 is a side elevational view of a closed top side-charging cupola in combination with charging and gas-treating equipment.
Figure 2 is a cross-sectional view taken on the line 2—2 of Figure 1.
Figure 3 is an enlarged cross-sectional view of a portion of the cupola including the tuyères and secondary air inlets.

In the preferred form of my invention, a cupola furnace 11 is mounted on piers 12 and consists of a cylinrical steel shell 13 having a fire brick lining 14 which terminates near the charging opening 15. Tuyères 16 are provided near the bottom of the cupola to admit primary combustion air under pressure through openings in the brick lining 14. The tuyères 16 are connected through a primary air manifold 17 extending around the cupola and communicating by the pipe 18 to a source of compresed air. A secondary air manifold 19 is provided conveniently adjacent said primary air manifold 17, this being also in communication with the same or a separate source of compressed air through the pipe 20. Secondary air inlet pipes 21 to 32 are connected at the lower end to the secondary air manifold 19 and extend into the shaft of the cupola furnace above the melting zone at several elevations. Each inlet pipe is provided with a valve 35 to regulate the air admitted through each inlet pipe.

At elevations corresponding to the elevation of the charging door, take-off openings 36 distributed around the periphery of the cupola are provided, these being connected to a take-off manifold 37 which communicates through the pipe 38 with dust-collecting equipment which will be hereinbelow described.

The charging opening 15 is conveniently provided with a vertically sliding door 39 held in place at the edges of the slide members 40, the door being raised and lowered by means of the cable 41 which passes over the pulleys 42 and 43 mounted on a superstructure frame 44, passing down to a position accessible to the operator for manual operation or for coordinated movement with the skip hoist cable 48. The cupola is closed above the door by a closure plate 45 upon which the superstructure 44 is erected.

The charging of the cupola may be hand, or as shown, by means of an inclined track 46 and a skip car 47 which when it reaches the elevation of the charging opening 15 discharges the mixture of scrap iron and coke into the shaft of the cupola. When the cable 41 connected to the door 39 is conveniently interconnected with the skip hoist cable 48 so that as the car 47 approaches the charging opening 15, the door 39 is raised, and after the car has discharged its charge and begins its descent, the door 39 is automatically lowered to close the charging opening.

A gauge weight 49 is suspended on the cable 50 through the closure plate 45 and over pulleys 51 and 52 for ascertaining the upper level of the charge in the cupola at any particular time, the other end of the cable 50 being provided with a marker 54 to indicate the position of the charge on a vertical indicator board 53 which is arranged to be accessible to the cupola operator.

The dust collector 57 is a chamber of relatively much greater cross-sectional area than the take-off pipe 38 so that the velocity of the gas stream is decreased to the point where the larger solid duct particles settle out. A hopper bottom 59 is provided on the dust-collecting chamber 57 from which the collected dust particles may be removed from time to time as required. The pipe 58 conveys the partly cleaned gases to the fine dust collector which, for example may be a water scrubber 60 where the upwardly flowing gas is met by a spray of water from the sprayer 61 connected to a source of water supply through the pipe 62. The water and collected dust are discharged through the waste discharge pipe 63 at the bottom of the scrubber 60 and settled or wasted. The cleaned gas is then carried by the pipe 64 to a variable capacity fan 68, the discharge of the fan being directly connected to the bottom of the stack 69.

The operation of my cupola and dust-collecting and cleaning system above described, proceeds as follows:

The cupola shaft is filled with the charge of scrap iron and coke and after the "lighting off" operation, the primary blast is turned on through the tuyères 16 receiving air from the manifold 17 and the primary air pipe 18, causing the coke to burn energetically with melting of the iron scrap in the charge. The iron scrap and coke are intermittently added at the charging door to keep the top level in the cupola at the desired elevation. In order to avoid the discharge of the carbon monoxide in explosive or combustible concentrations above the cupola charge, secondary air is admitted through one or more of the pipes 21 to 32, as selected by the operator to correspond to the position of the melting zone at that particular time, this secondary air forming combustible mixtures with the carbon monoxide generated above the melting zone and burning it in the interstices in the charge in the upper portion of the cupola. This results not only in the utilization of the heat of combustion of the carbon monoxide in beneficially preheating the charge of coke and scrap iron, but more importantly, results in a lowering of the concentration of carbon monoxide in the space adjacent the door in the upper part of the cupola so that this collected gas is no longer combustible or explosive. When the cupola door is closed the positive pressure provided in the cupola by the primary air blast continuously forces the discharged gases and dust into and through the dust collector 57, the scrubber 60, and into the stack 69 for discharge to the atmosphere.

When the charging door 39 is opened for the admission of iron and coke, the suction from the fan 68 is applied to the outlet of the scrubber 60 so that all of the gases generated in the cupola, plus the air which is drawn in at the charging opening are brought into the gas cleaning system under suction from said fan. Since the secondary air introduced through the inlet pipes 21 to 32 has reduced the carbon monoxide discharged above the material in the cupola to a point where it is no longer explosive or combustible, the fresh air drawn in around the charging opening does not cause the burning or explosion of carbon monoxide, as it ordinarily does in standard cupolas not provided with the secondary air inlets. Thus the combined air and cupola gas which is drawn off may be safely handled in the dust-collecting equipment.

By intermittently adjusting the suction of the fan corresponding to the periods when the charging door is opened or closed, the system may be satisfactorily operated without disturbance of the melting operation. A variable capacity fan provides one means of adjusting the pressures in the system. These may be carried out by hand but are preferably made automatic by the use of pressure controlled devices.

My improved cupola and cupola gas-treating system permits the safe operation of a closed top cupola, and the simple manner of closing the cupola top to entrap the gaseous discharge, while continuing the use of side door cupola-charging equipment, provides for the first time an economical system for controlling the emission of dust from cupola operation.

I claim:

1. An iron melting cupola adapted for the production of cast iron comprising a vertically disposed cylindrical shell having a firebrick lining for substantially its entire height, with top and bottom closure plates, said shell and lining having openings therein for the charging of iron, coke and accessory solid materials and the introduction of combustion air, and for the off-take of dust-, smoke- and fume-laden combustion gases; a substantially gas-tight door for said charging opening; means for conducting primary combustion air into said cupola below the melting zone; means for introducing secondary combustion air into said cupola at one or more elevations above the melting zone within the charged solid materials zone; and off-take conduit means for conveying the gaseous discharge away from the top portion of said cupola.

2. An iron melting cupola adapted for the production of cast iron comprising a vertically disposed cylindrical shell having a firebrick lining for substantially its entire height, with top and bottom closure plates, said shell and lining having openings therein for the charging of iron, coke and accessory solid materials and the introduction of combustion air, and for the off-take of dust-, smoke- and fume-laden combustion gases; a substantially gas-tight door for said charging opening; means for conducting primary combustion air into said cupola below the melting zone; means for introducing secondary combustion air into said cupola at one or more elevations above the melting zone within the charged solid materials zone; and off-take conduit means for conveying the gaseous discharge away from the top portion of said cupola, said means consisting of an off-take manifold connecting a plurality of off-take openings in said shell, said openings being disposed at approximately the elevation of the charging opening.

3. In an iron melting closed-top cupola adapted for making cast iron, having a vertically disposed cylindrical shell with a firebrick lining for substantially its entire height, a charging door opening for the charging of iron, coke and accessory solid materials, and means for the introduction of primary combustion air below the melting zone; a movable door for said charging opening; a plurality of pipes for introducing secondary combustion air into said cupola at one or more elevations above the melting zone within the charged solid materials zone; and off-take conduit means adjacent said charging door for taking the gaseous discharge away from the top portion of said cupola.

4. An iron melting cupola and a cupola exhaust purifier combination comprising a cupola having a side charging door for solid materials, a top closure above said door, off-take means adjacent said charging door for dust-, smoke- and fume-laden combustion gases, means for conducting primary combustion air into said cupola below the melting zone, and means for introducing secondary combustion air into said cupola at one or more elevations above the melting zone and within the charged solid materials zone.

5. An iron melting cupola and a cupola exhaust purifier combination comprising a cupola having a side charging door, a top closure above said door, off-take means adjacent said charging door for dust-, smoke- and fume-laden combustion gases, means for conducting primary combustion air into said cupola below the melting zone, and means for introducing secondary combustion air into said cupola at one or more elevations above the melting zone and within the charged zone; gas exhausting means communicating with said off-take means of said cupola; and closed chamber gas-treating means interposed between said off-take means and said gas-exhausting means.

6. An iron melting cupola and dust, fume and smoke eliminator combination comprising a vertically disposed cylindrical shell having a firebrick lining for substantially its entire height, with top and bottom closure plates, said shell and lining having openings therein for the charging of solid materials and the introduction of combustion air, and for the off-take of dust-, smoke- and fume-laden combustion gases; a substantially gas-tight door for said charging opening; means for conducting primary combustion air into said cupola below the melting zone; a pipe or pipes for introducing secondary combustion air into said cupola at one or more elevations above the melting zone within the charged material zone; off-take conduit means for conveying the gaseous discharge away from the top portion of said cupola; and exhaust fan means connected to said off-take conduit.

7. An iron melting cupola and dust, fume and smoke eliminator combination comprising a vertically disposed cylindrical shell having a firebrick lining for substantially its entire height, with top and bottom closure plates, said shell and lining having openings therein for the charging of solid materials and the introduction of combustion air, and for the off-take of dust-, smoke- and fume-laden combustion gases; a substantially gas-tight door for said charging opening; means for conducting primary combustion air into said cupola below the melting zone; a pipe or pipes for introducing secondary combustion air into said cupola at one or more elevations above the melting zone within the charged material zone; off-take conduit means for conveying the gaseous discharge away from the top portion of said cupola; closed chamber dust, fume and smoke eliminator means connected to said off-take manifold; and exhausting fan means communicating with the outlet of said dust, fume and smoke eliminator means.

8. The method of operating a closed top iron melting cupola to minimize the temperature and volume of the outgoing gases comprising blowing secondary combustion air into the feeding zone of the cupola above the melting zone and below the top of the charge in the cupola in quantities sufficient to burn any excess carbon monoxide; collecting the gases in the portion of said cupola above the charge; and at times applying suction to withdraw the collected gases from said top portion of the cupola.

9. The method of operating an iron melting cupola having an intermittently opened charging door to minimize the temperature and volume of the outgoing gases comprising blowing secondary combustion air into the feeding zone of the cupola above the melting zone and below the top of the charge in the cupola in quantities sufficient to burn any excess carbon monoxide; collecting the gases in the portion of said cupola above the charge; and applying suction to the top portion of said cupola when said charging door is opened.

JOHN F. DRAKE.

REFERENCES CITED

The following references are of record in the file of this patent:

UNITED STATES PATENTS

| Number | Name | Date |
|---|---|---|
| 1,065,454 | Leitch | June 24, 1913 |
| 1,640,251 | Poumay | Aug. 23, 1927 |
| 1,884,048 | McCloskey | Oct. 25, 1932 |
| 1,884,088 | Miller | Oct. 25, 1932 |

FOREIGN PATENTS

| Number | Country | Date |
|---|---|---|
| 578,023 | Great Britain | June 12, 1946 |